United States Patent
Ogasawara et al.

(10) Patent No.: US 11,408,532 B2
(45) Date of Patent: Aug. 9, 2022

(54) ELECTROMAGNETIC SWITCHING VALVE

(71) Applicant: MIKUNI CORPORATION, Tokyo (JP)

(72) Inventors: Toshiki Ogasawara, Iwate (JP); Masashi Ueda, Iwate (JP)

(73) Assignee: MIKUNI CORPORATION, Tokyo (JP)

( * ) Notice: Subject to any disclaimer, the term of this patent is extended or adjusted under 35 U.S.C. 154(b) by 0 days.

(21) Appl. No.: 17/030,390

(22) Filed: Sep. 24, 2020

(65) Prior Publication Data
US 2021/0131581 A1 May 6, 2021

(30) Foreign Application Priority Data
Nov. 5, 2019 (JP) .............................. JP2019-200835

(51) Int. Cl.
*F16K 31/06* (2006.01)
*F16K 11/07* (2006.01)
*F16K 27/04* (2006.01)
*F01L 1/344* (2006.01)

(52) U.S. Cl.
CPC ........ *F16K 31/0613* (2013.01); *F01L 1/3442* (2013.01); *F16K 11/0712* (2013.01); *F16K 27/041* (2013.01); *F16K 27/048* (2013.01); *F16K 31/0675* (2013.01); *F01L 2001/3443* (2013.01); *F16K 11/07* (2013.01); *F16K 31/061* (2013.01)

(58) Field of Classification Search
CPC ............. F16K 31/0613; F16K 31/0675; F16K 31/061; F16K 27/048; F16K 27/041; F16K 11/0712; F16K 11/07; F16L 1/3442; F01L 2001/3443
See application file for complete search history.

(56) References Cited

U.S. PATENT DOCUMENTS

| | | | |
|---|---|---|---|
| 9,624,948 B2 * | 4/2017 | Ochiai ...................... F01L 1/34 |
| 2005/0211938 A1 * | 9/2005 | Ryuen ................. F16K 11/0716 | 251/129.15 |
| 2008/0035225 A1 * | 2/2008 | Tackes ................ F16K 11/0716 | 137/625.35 |
| 2013/0134338 A1 * | 5/2013 | Suzuki .................. F01L 1/3442 | 251/129.15 |

(Continued)

FOREIGN PATENT DOCUMENTS

JP 2009063022 3/2009

*Primary Examiner* — Patrick C Williams
(74) *Attorney, Agent, or Firm* — JCIPRNET

(57) ABSTRACT

An electromagnetic switching valve includes: a sleeve, defining a port communicating with an oil passage; a spool, reciprocally movably disposed on an axis in the sleeve, opening and closing the port; an electromagnetic actuator, including a plunger disposed on the axis and a stator; a transmission member interposed between the plunger and the spool; and an energizing spring, energizing the spool toward the plunger. The transmission member includes a first abutting part of a convex shape tiltably abutting against a receiving recess of the plunger; a second abutting part of a concave shape abutting against a convex end of the spool; and an outer peripheral wall that, in a state of being deviated from the axis and inclined, regulates the inclination by contacting an inner peripheral surface of the sleeve or the stator.

8 Claims, 13 Drawing Sheets

(56) References Cited

U.S. PATENT DOCUMENTS

2016/0201822 A1\* 7/2016 Takada ..................... F01L 1/34
                                                    251/129.15
2021/0207731 A1\* 7/2021 Narita ................. F15B 13/0402

\* cited by examiner

ELECTROMAGNETIC SWITCHING VALVE

CROSS-REFERENCE TO RELATED APPLICATION

This application claims the priority benefit of Japan application serial no. 2019-200835, filed on Nov. 5, 2019. The entirety of the above-mentioned patent application is hereby incorporated by reference herein and made a part of this specification.

BACKGROUND

Technical Field

The disclosure relates to an electromagnetic switching valve that operates a spool by an electromagnetic actuator and switches an oil passage of hydraulic oil. In particular, the disclosure relates to an electromagnetic switching valve applied to a valve timing changing device, wherein the valve timing changing device changes opening and closing timing (valve timing) of an intake valve or an exhaust valve in an internal combustion engine mounted on a vehicle such as an automobile or a two-wheeler or the like.

Related Art

As a conventional electromagnetic switching valve, there has been known an electromagnetic spool valve including: a spool valve, including a sleeve, a spool slidably disposed in the sleeve, and a return spring returning the spool to a rest position; an electromagnetic actuator, including a coil, a plunger and a stator; and a shaft of a tubular shape as a transmission member, interposed between the plunger and the spool and transmitting a driving force (for example, see Patent Document 1).

The electromagnetic spool is typically disposed and used so that the plunger reciprocally moves in a horizontal direction.

In this form of use, in a state where the plunger advances to compress the return spring and moves the spool, if foreign matter or the like in the hydraulic oil jams around the spool, the spool is locked and does not return to the rest position. In the locked state, when only the plunger returns to the rest position, the shaft disengages from the spool or the plunger and becomes free. Moreover, if the shaft tilts due to its own weight, external vibration, or the like, the shaft cannot return to the original position, and a decrease in the flow rate of the hydraulic oil or an inoperability may occur.

Patent Document

[Patent Document 1] Japanese Patent Laid-Open No. 2009-63022

The disclosure has been made in view of the above circumstances, and an object thereof is to provide an electromagnetic switching valve, in which the transmission member automatically returns to the original position and maintains a desired function even if it is temporarily free and deviates from a predetermined position due to locking of the spool or the like.

SUMMARY

An electromagnetic switching valve includes: a sleeve, defining a port communicating with an oil passage supplying or discharging hydraulic oil; a spool, reciprocally movably disposed on a predetermined axis in the sleeve, opening and closing the port; an electromagnetic actuator, including a plunger disposed on the axis and a stator exerting a magnetomotive force on the plunger; a transmission member of a tubular shape, disposed on the axis to be interposed between the plunger and the spool and transmit a driving force; and an energizing spring, energizing the spool toward the plunger. The transmission member includes a first abutting part of a convex shape tiltably abutting against a receiving recess of the plunger; a second abutting part of a concave shape abutting against a convex end of the spool; and an outer peripheral wall that, in a state of being deviated from the axis and inclined, regulates the inclination by contacting an inner peripheral surface of the sleeve or the stator so that at least a part of the first abutting part faces the receiving recess and at least a part of the second abutting part faces the convex end.

DESCRIPTION OF THE EMBODIMENTS

Figure 1:
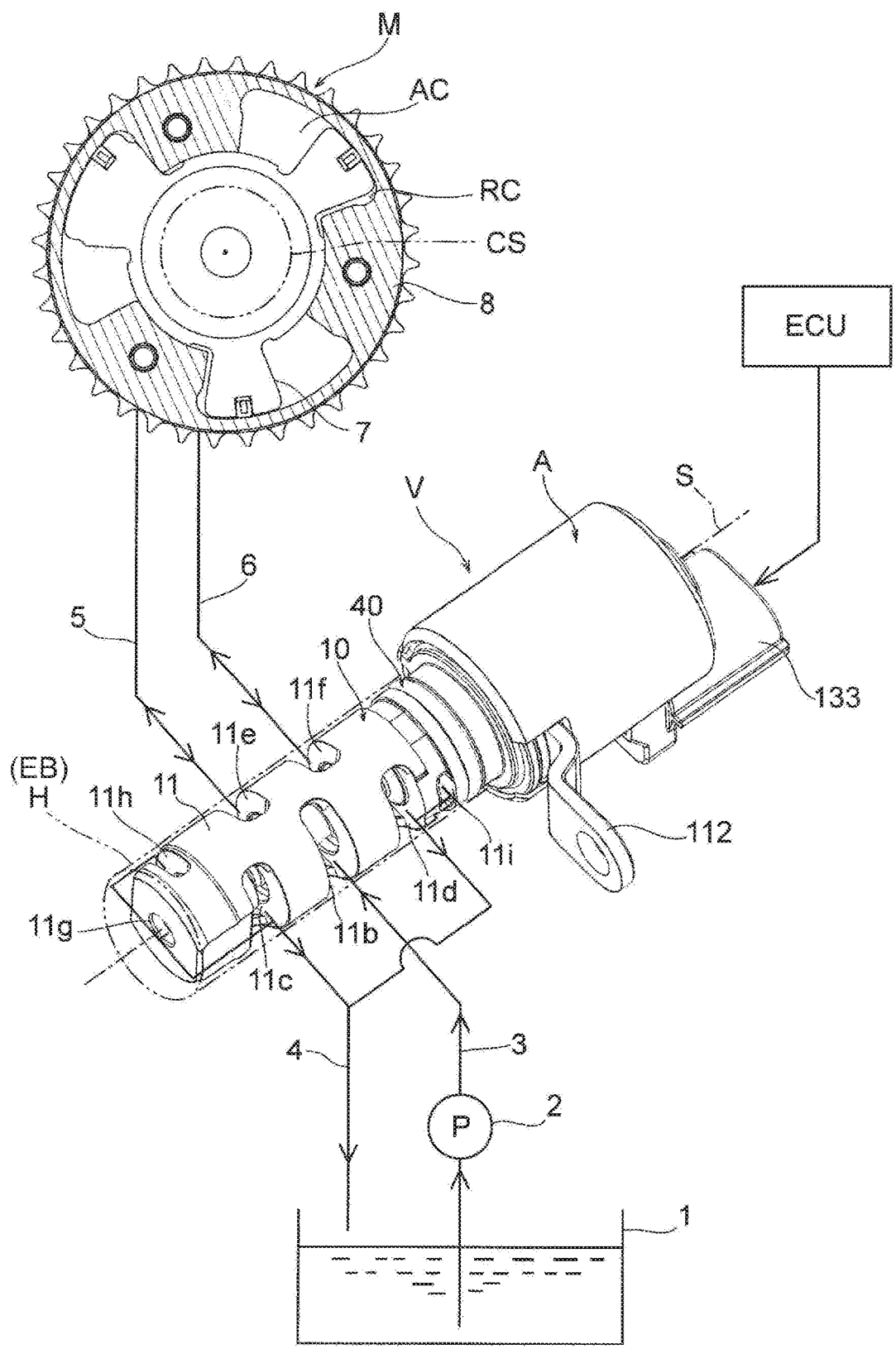
FIG. 1 is a configuration diagram of a case where an electromagnetic switching valve of the disclosure is applied to a valve timing changing device of an internal combustion engine.

Hereinafter, embodiments of the disclosure are described with reference to the accompanying drawings.

An electromagnetic switching valve V according to an embodiment of the disclosure is applied to a valve timing changing device M of an internal combustion engine.

The electromagnetic switching valve V is appropriately driven and controlled by a control unit ECU according to an operation state of a vehicle and the internal combustion engine.

An engine body EB includes: a fitting hole H into which the electromagnetic switching valve V is fitted; a supply oil passage 3 through which hydraulic oil in an oil pan 1 is supplied via an oil pump 2; a discharge oil passage 4 through which the hydraulic oil is discharged from the electromagnetic switching valve V toward the oil pan 1; a first oil passage 5 communicating with one of a retard chamber RC and an advance chamber AC of the valve timing changing device M; and a second oil passage 6 communicating with the other of the retard chamber RC and the advance chamber AC of the valve timing changing device M.

The valve timing changing device M includes: a vane rotor 7 rotating integrally with a camshaft CS; and a housing rotor 8, housing the vane rotor 7 so that the vane rotor 7 is relatively rotatable in a predetermined angle range and rotating in conjunction with a crankshaft.

The advance chamber AC and the retard chamber RC to and from which the hydraulic oil is supplied and discharged are defined by an internal space of the housing rotor 8 and the vane rotor 7.

Here, when the valve timing changing device M is applied to the camshaft CS on an intake side, the first oil passage 5 is connected to the advance chamber AC and the second oil passage 6 is connected to the retard chamber RC.

On the other hand, when the valve timing changing device M is applied to the camshaft CS on an exhaust side, the first oil passage 5 is connected to the retard chamber RC and the second oil passage 6 is connected to the advance chamber AC.

Figure 2:
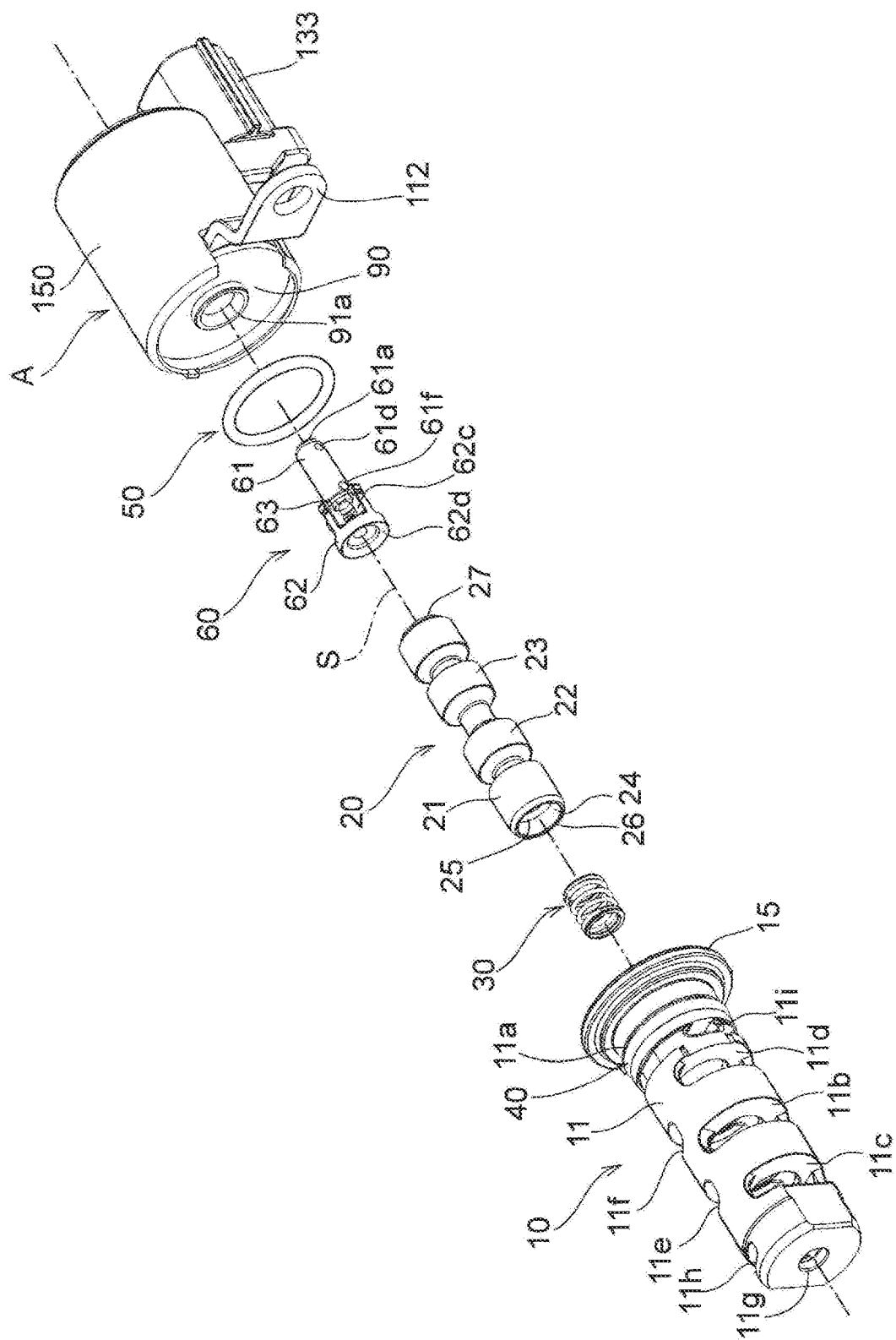
FIG. 2 is an exploded perspective view of an electromagnetic switching valve according to the embodiment of the disclosure as viewed from a sleeve side.
Figure 3:
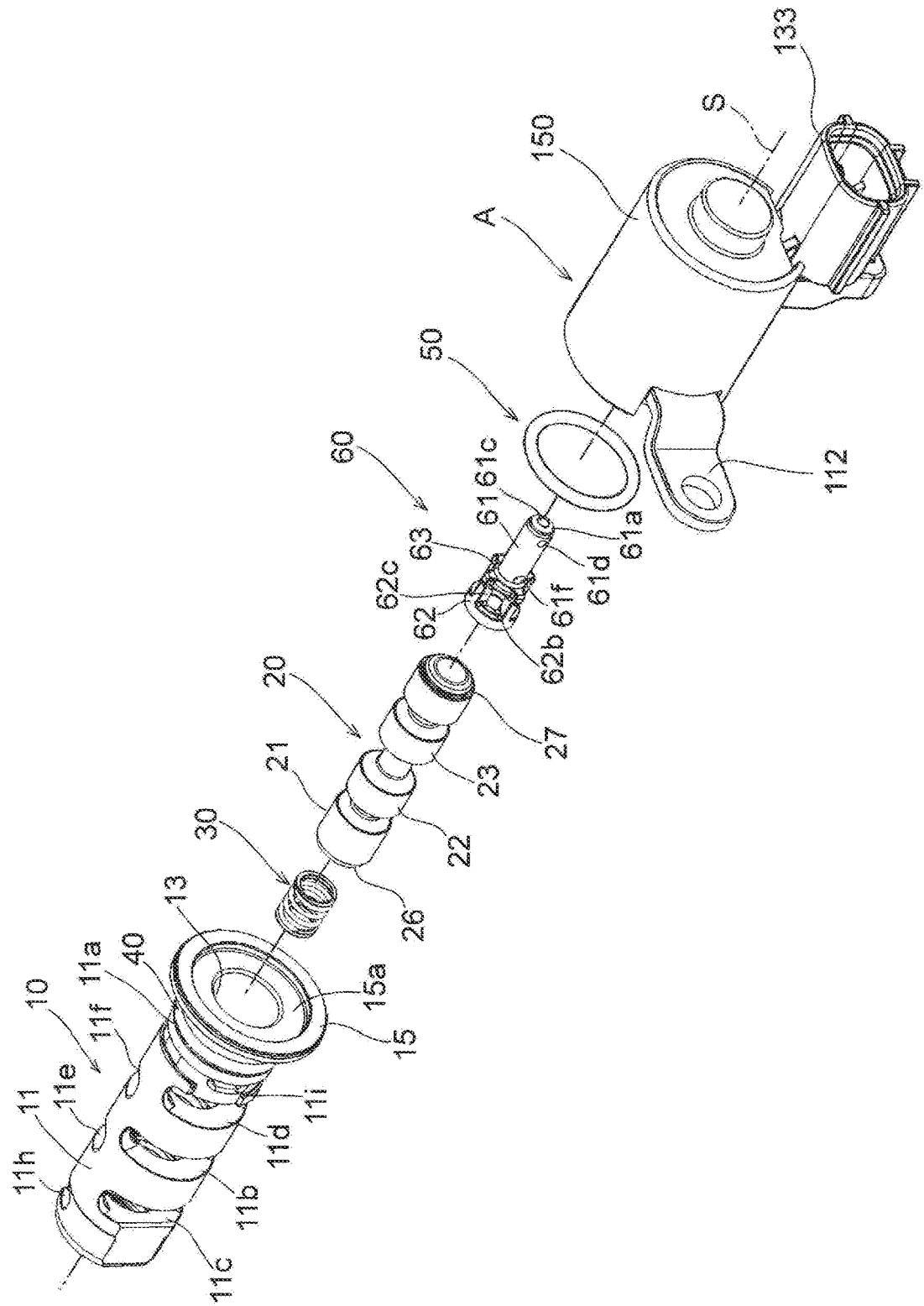
FIG. 3 is an exploded perspective view of an electromagnetic switching valve according to the embodiment of the disclosure as viewed from an electromagnetic actuator side.

As shown in FIG. 2 and FIG. 3, the electromagnetic switching valve V includes a sleeve 10, a spool 20, an energizing spring 30, seal members 40 and 50, a transmission member 60, and an electromagnetic actuator A.

Figure 4:
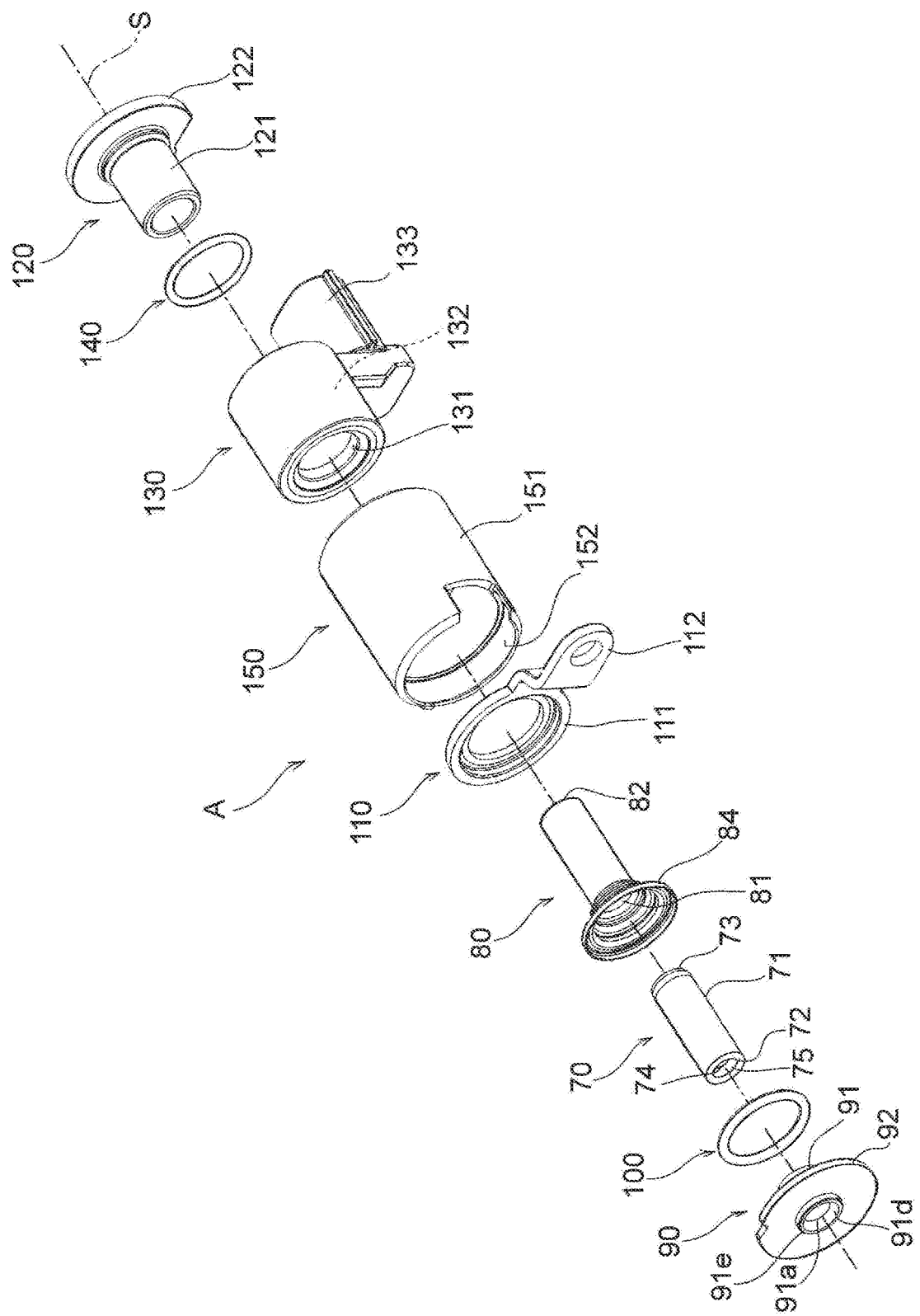
FIG. 4 is an exploded perspective view of an electromagnetic actuator included in an electromagnetic switching valve according to an embodiment.
Figure 9:
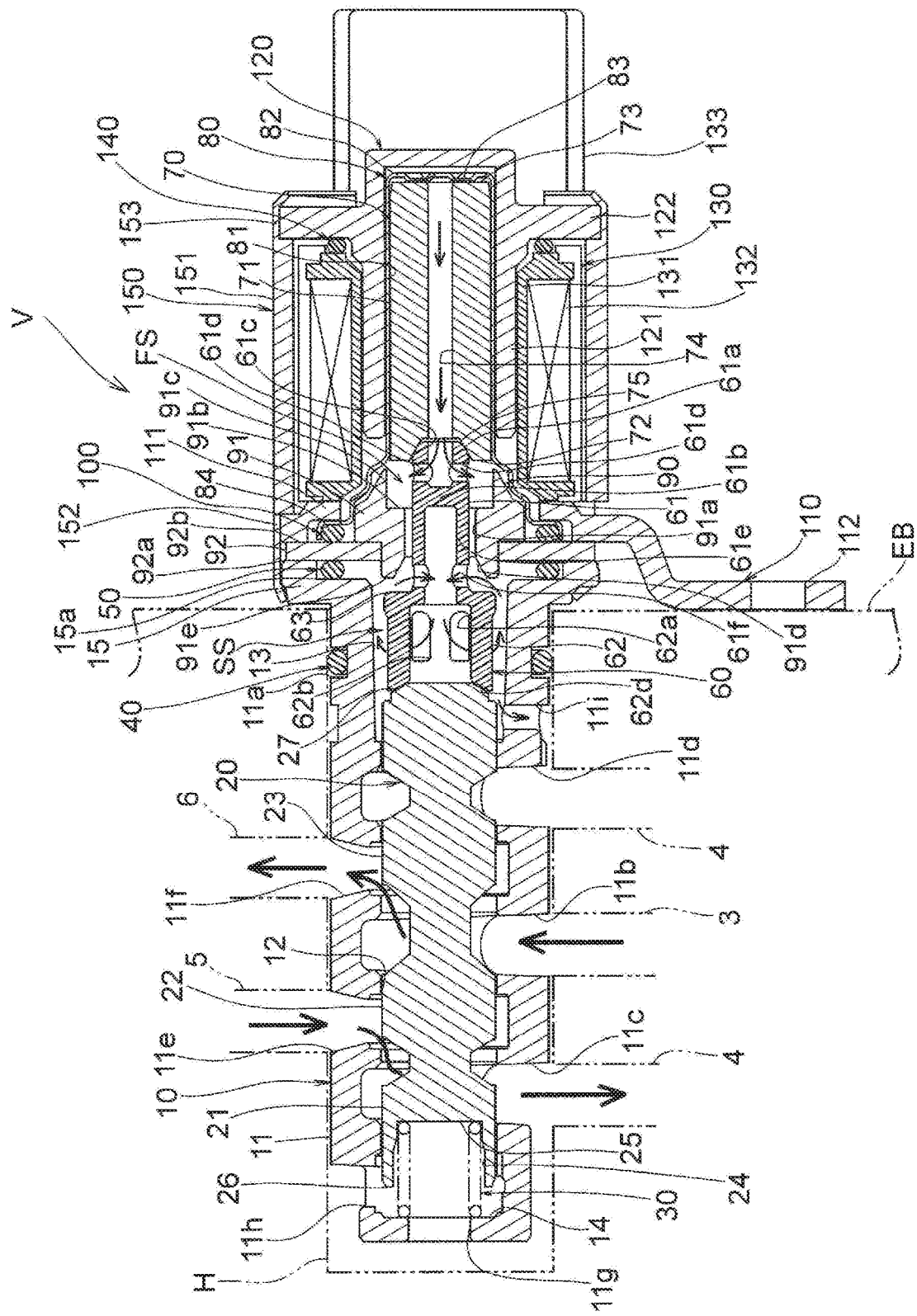
FIG. 9 is a cross-sectional view describing an operation of an electromagnetic switching valve according to an embodiment, showing a state in which a spool and a plunger are located at a rest position.
Figure 10:
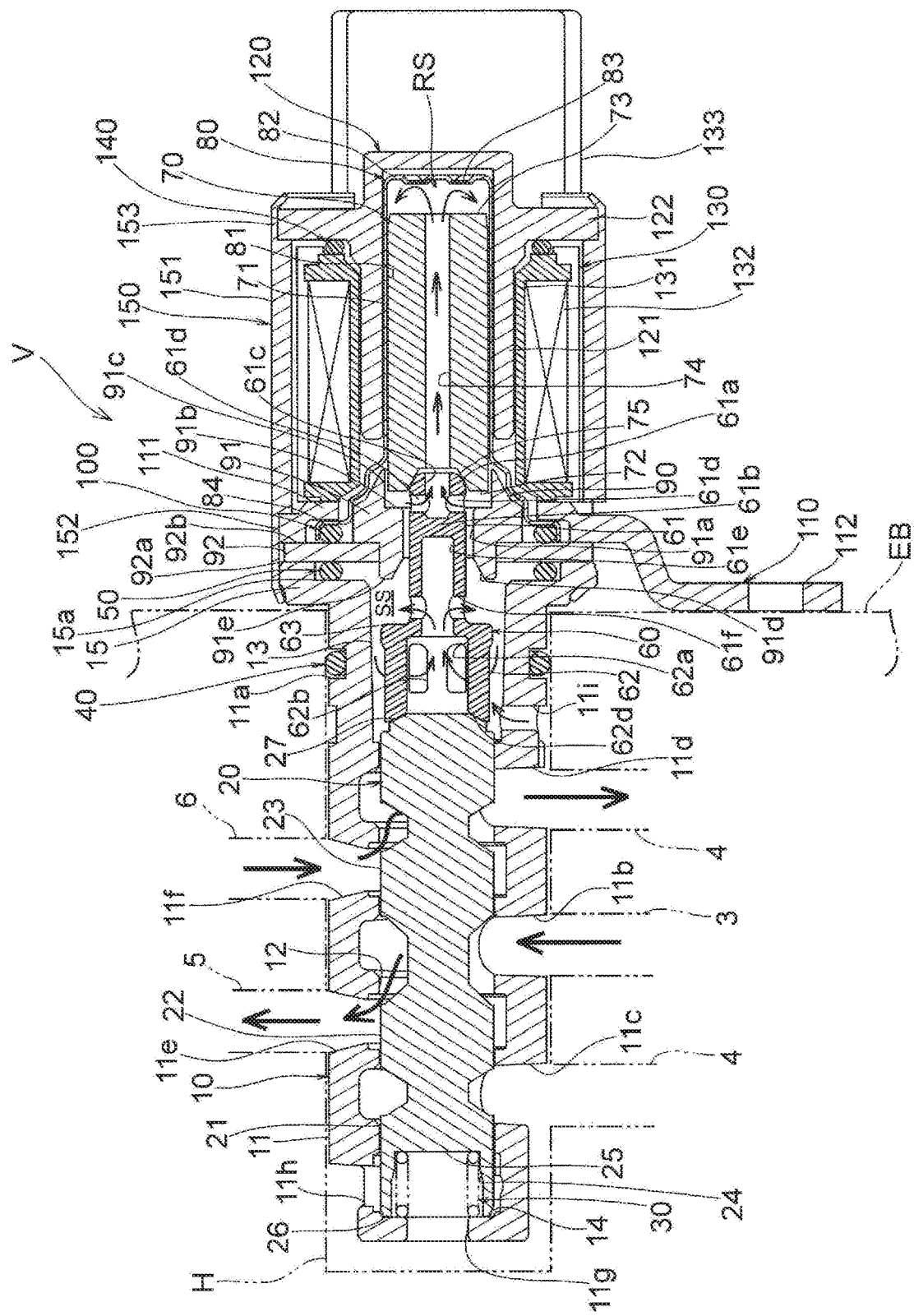
FIG. 10 is a cross-sectional view describing an operation of an electromagnetic switching valve according to an embodiment, showing a state in which a spool and a plunger advance and are located at a maximum movement position.

As shown in FIG. 4, FIG. 9 and FIG. 10, the electromagnetic actuator A includes a plunger 70, a guide sleeve 80, a stator 90, a seal member 100, a bracket 110, an inner yoke 120, a mold unit 130, a seal member 140, and an outer yoke 150.

Here, the electromagnetic switching valve V is used with movement directions of the spool 20, the transmission member 60, and the plunger 70 (axis S direction) oriented in a horizontal direction substantially perpendicular to a vertical direction Vd.

The sleeve 10 is formed of a metal material such as aluminum or the like into a cylindrical shape centered on an axis S, and includes, as shown in FIG. 2, FIG. 3 and FIG. 9, an outer peripheral surface 11, a seal groove 11a, a supply port 11b, discharge ports 11c and 11d, a first port 11e, a second port 11f, communication passages 11g, 11h and 11i, an inner peripheral surface 12, an inner peripheral surface 13, a receiving part 14, and a flange 15.

The outer peripheral surface 11 is formed as a cylindrical surface centered on the axis S, and is fitted in the fitting hole H of the engine body EB.

The seal groove 11a is formed as an annular groove on the outer peripheral surface 11 for the seal member 40 to be fitted therein.

The supply port 11b communicates with the supply oil passage 3. The discharge ports 11c and 11d communicate with the discharge oil passage 4. The first port 11e communicates with the first oil passage 5. The second port 11f communicates with the second oil passage 6.

The communication passage 11g is formed at an end of the sleeve 10 and communicates a space where the energizing spring 30 is disposed with the discharge oil passage 4.

The communication passage 11h opens in a radial direction near the end of the sleeve 10 and communicates the space where the energizing spring 30 is disposed with the discharge oil passage 4.

The communication passage 11i communicates an internal space SS where the transmission member 60 is disposed with the discharge oil passage 4 in a region of the inner peripheral surface 13 of the sleeve 10.

The inner peripheral surface 12 is formed as a cylindrical surface centered on the axis S, and makes close contact with and slidably guides the outer peripheral surface 21 of the spool 20.

The inner peripheral surfaced 13 is formed as a conical surface centered on the axis S, having a larger inner diameter than the inner peripheral 12 and widened at an end toward the flange 15, and is formed so that the internal space SS is secured around the transmission member 60 in the state in which the transmission member 60 is disposed.

The receiving part 14 serves to receive a first end 26 of the spool 20 and stop the spool 20 in a maximum advance position, and also serves to receive one end of the energizing spring 30.

The flange 15 is joined to the stator 90 with an end of the outer yoke 150 being crimped, and is connected and fixed to the electromagnetic actuator A. In addition, in the flange 15, an annular recess 15a is provided housing the seal member 50 so as to sandwich the seal member 50 in cooperation with the stator 90.

As shown in FIG. 2, FIG. 3 and FIG. 9, the spool 20 is formed so as to extend in the axis S direction, and includes the outer peripheral surface 21, a first valve 22, a second valve 23, a recess 24, a receiving part 25, the first end 26, and a second end 27 as a convex end.

To slide on the inner peripheral surface 12 of the sleeve 10, the outer peripheral surface 21 is formed in a cylindrical shape centered on the axis S, and has an outer diameter substantially the same as or slightly smaller than an inner diameter of the inner peripheral surface 12.

The first valve 22 is formed so as to define the outer peripheral surface 21 that is wider than an opening width of the first port 11e in the axis S direction, and opens and closes the first port 11e of the sleeve 10 by moving in the axis S direction.

The second valve 23 is formed so as to define the outer peripheral surface 21 that is wider than an opening width of the second port 11f in the axis S direction, and opens and closes the second port 11f of the sleeve 10 by moving in the axis S direction.

The recess 24 is formed on a side of the first end 26 so as to house the energizing spring 30 in an extensible and compressible manner.

The receiving part 25 is formed as a bottom wall of the recess 24 to receive the other end of the energizing spring 30 housed in the recess 24.

The first end 26 is formed as an annular end surface and releasably abuts against the receiving part 14 of the sleeve 10.

Figure 6:
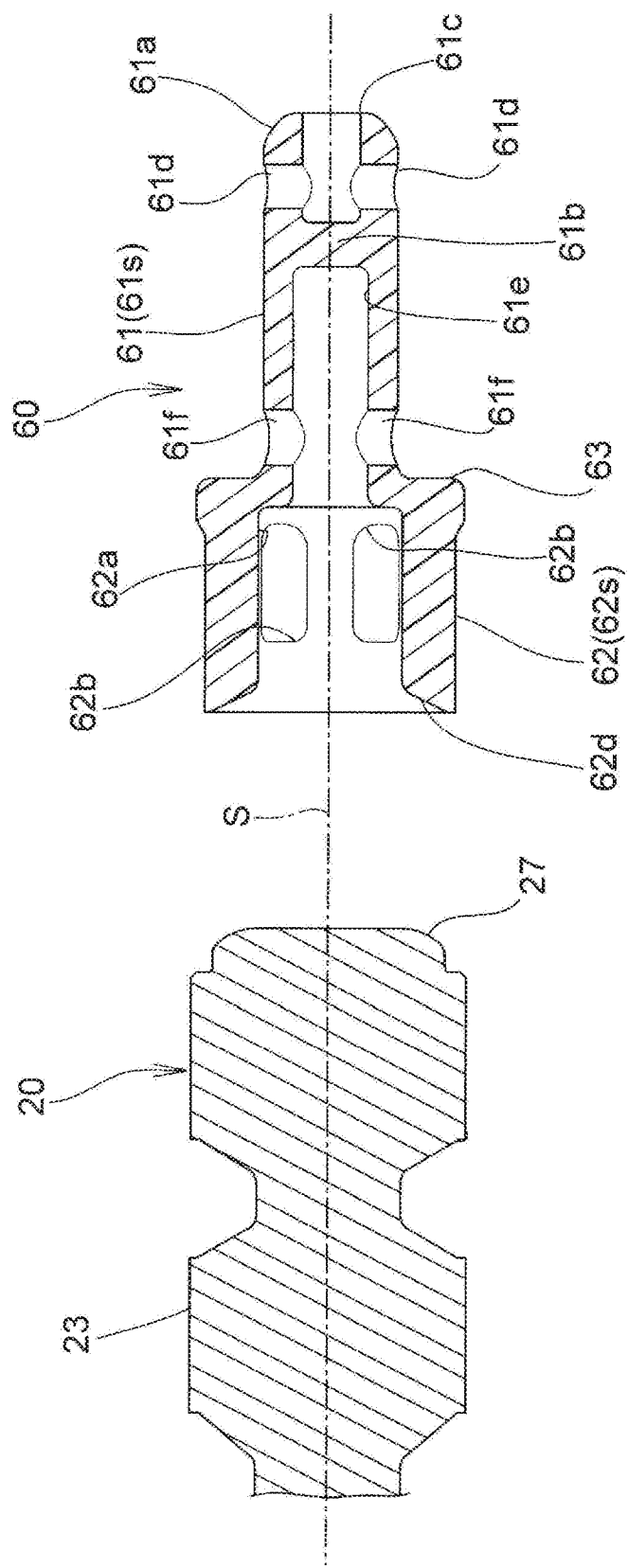
FIG. 6 is a cross-sectional view showing a relationship between a transmission member and a spool included in an electromagnetic switching valve according to an embodiment.
Figure 8:
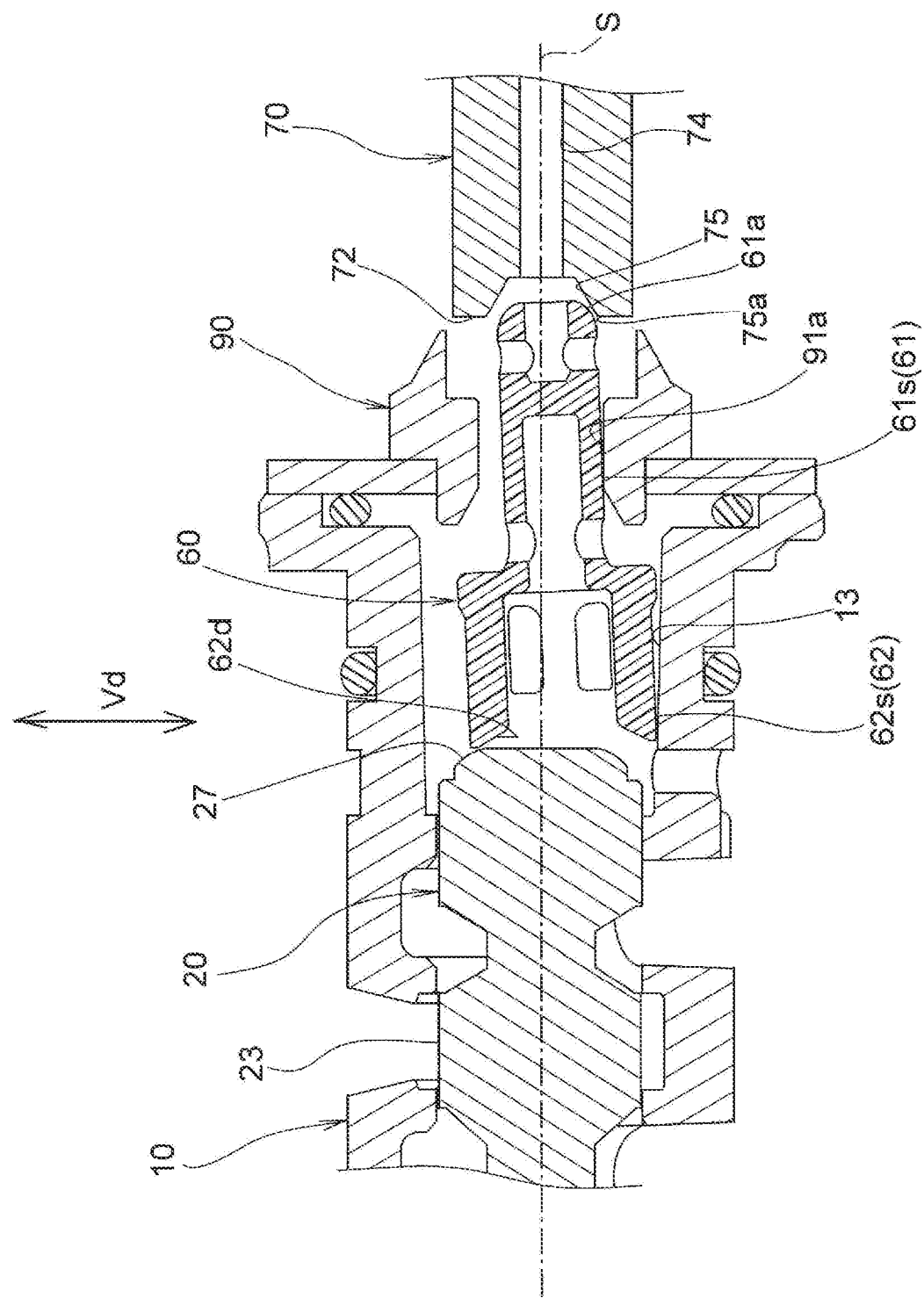
FIG. 8 is a cross-section view showing a state in which a spool is locked and a transmission member becomes free and inclined in an electromagnetic switching valve according to an embodiment.

As shown in FIG. 6 and FIG. 8, the second end 27 is formed as an annular and convex curved surface centered on the axis S to abut against a second annular abutting part 62d of the transmission member 60 in the axis S direction.

The energizing spring 30 is a compression type coil spring, and is assembled so that one end thereof abuts against the receiving part 14 of the sleeve 10 and the other end abuts against the receiving part 25 of the spool 20.

When the energizing spring 30 is in a rest state, as shown in FIG. 9, the energizing spring 30 exerts an energizing force causing the plunger 70 to retreat to a rest position and stopping the spool 20 in a position where the first valve 22 cuts off communication between the first port 11e and the supply port 11b and communicates the first port 11e with the discharge port 11c, and the second valve 23 communicates the second port 11f with the supply port 11b and cuts off communication between the second port 11f and the discharge port 11d.

The seal member 40 is an O-ring made of rubber, fitted into the seal groove 11a of the sleeve 10 and sealing a space between the engine body EB and the sleeve 10.

The seal member 50 is an O-ring made of rubber, disposed in the recess 15a of the flange 15 of the sleeve 10 and sealing a space between the sleeve 10 and the stator 90.

Figure 5:
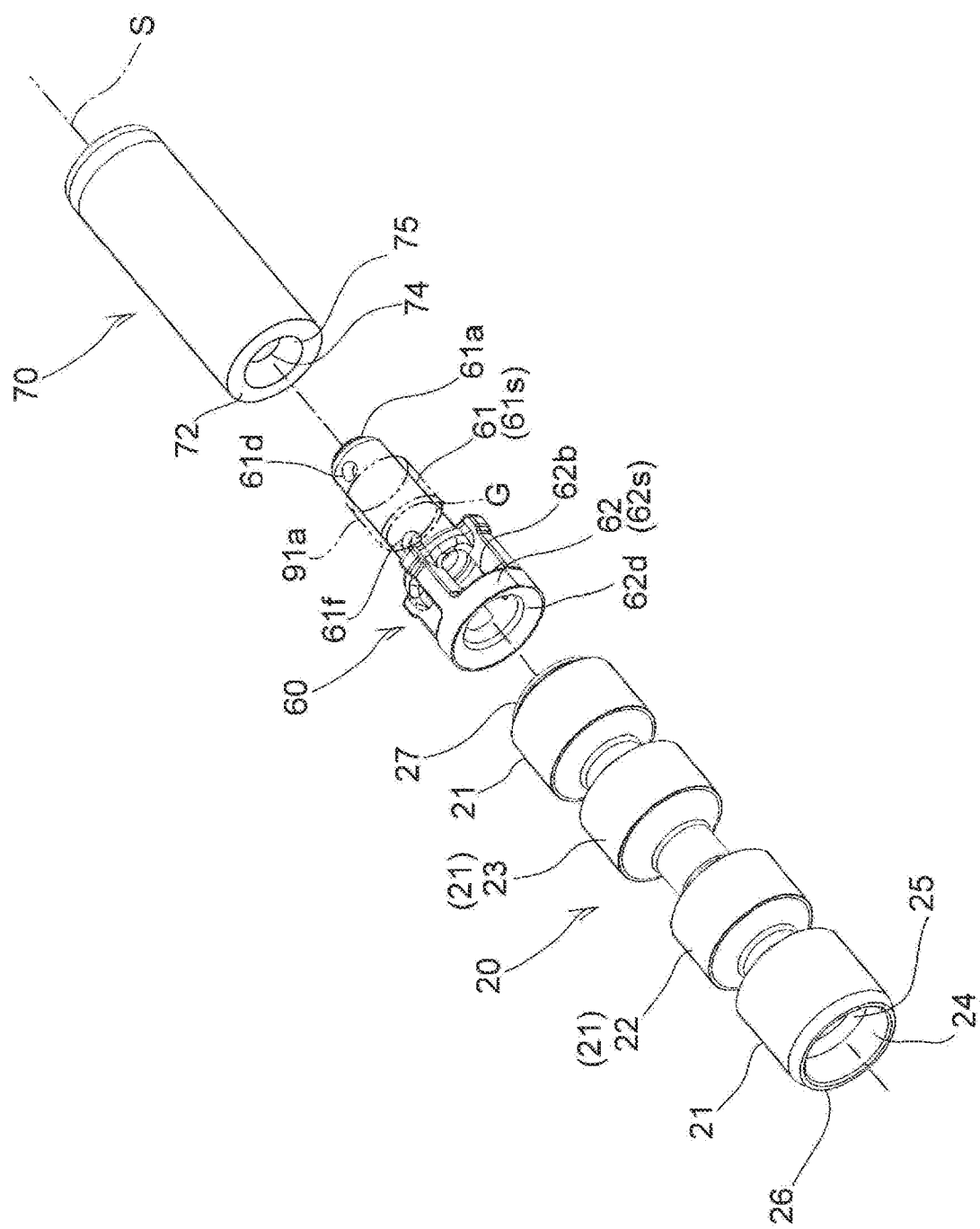
FIG. 5 is an exploded perspective view of a sleeve, a transmission member, and a plunger included in an electromagnetic switching valve according to an embodiment.
Figure 7:
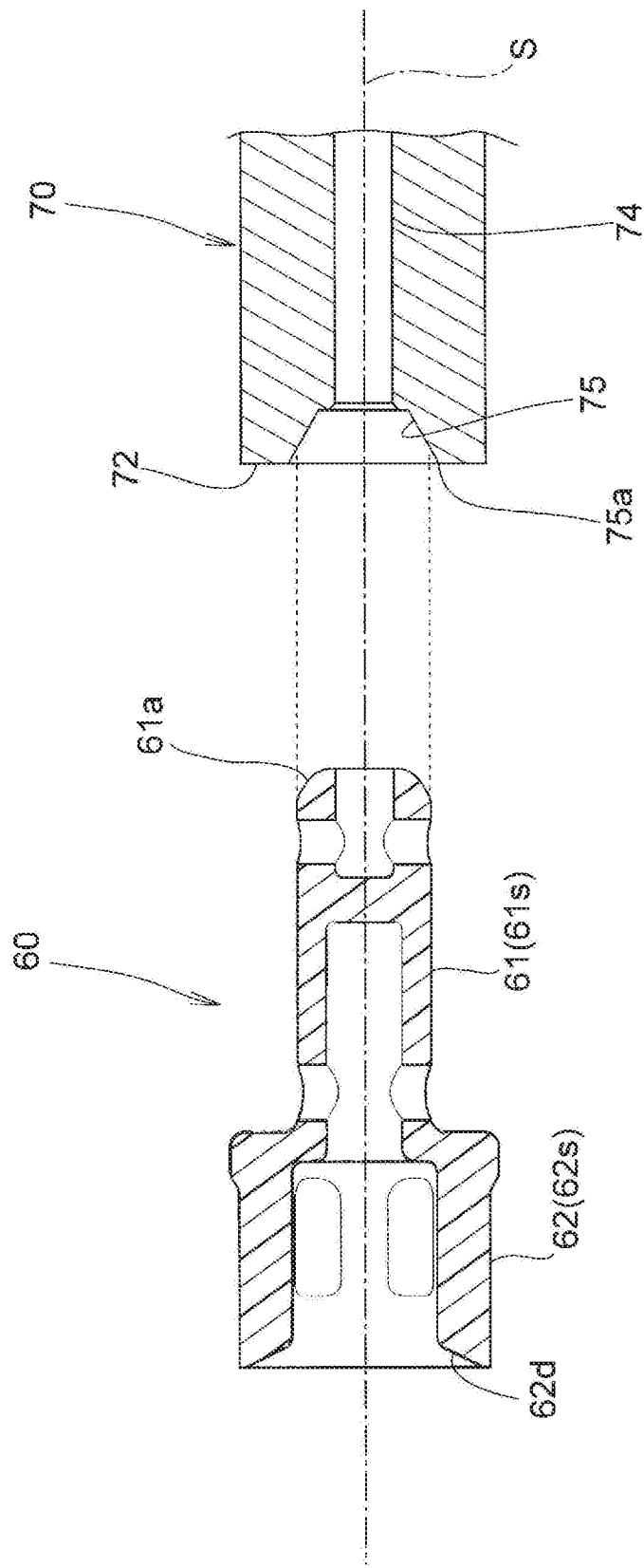
FIG. 7 is a cross-sectional view showing a relationship between a transmission member and a plunger included in an electromagnetic switching valve according to an embodiment.

The transmission member 60 is formed of a resin material into a tubular shape extending in the axis S direction to be interposed between the plunger 70 and the spool 20 and transmit the driving force. As shown in FIG. 5 to FIG. 7, the transmission member 60 includes a small-diameter tubular part 61 inserted through an insertion hole 91a of the stator 90, a large-diameter tubular part 62 disposed in the region of the inner peripheral surface 13 inside the sleeve 10, and an annular stepped part 63.

The small-diameter tubular part 61 includes a mall-diameter outer peripheral wall 61s, a first abutting part 61a, a facing wall 61b, a first internal passage 61c, two first openings 61d, a second internal passage 61e, and two second openings 61f.

The small-diameter tubular part 61 is a region inserted through the insertion hole 91a of the stator 90, and, as shown in FIG. 8, when the transmission member 60 deviates from the axis S and is inclined, the small-diameter outer peripheral wall 61s defined by the small-diameter tubular part 61 may come into contact with the inner peripheral surface of the insertion hole 91a.

The first abutting part 61a is formed as an annular and convex curved surface centered on the axis S, and is inserted into a receiving recess 75 of the plunger 70 and can tiltably abut against the receiving recess 75.

The facing wall 61b is formed as a cutoff wall facing a through passage 74 of the plunger 70 in the axis S direction.

The first internal passage 61c forms a cylindrical hole that is formed closer to the plunger 70 than the facing wall 61b in the axis S direction and that extends in the axis S direction to communicate with the through passage 74 of the plunger 70. The passage area of the first internal passage 61c is formed equal to or larger than the passage area of the through passage 74. Here, the passage area of the first internal passage 61c is the passage area of the first internal passage 61c in a cross section perpendicular to the axis S; the passage area of the through passage 74 is the passage area of the through passage 74 in a cross section perpendicular to the axis S.

As shown in FIG. 9 and FIG. 10, the first opening 61d forms a circular hole that is formed closer to the plunger 70 than the insertion hole 91a of the stator 90 in the axis S direction and that opens the first internal passage 61c in the radial direction. The passage area of the first opening 61d is formed equal to or larger than the passage area of the first internal passage 61c. Here, the passage area of the first opening 61d is the passage area of two first openings 61d that form circular holes.

The second internal passage 61e forms a cylindrical hole that is formed closer to the spool 20 than the facing wall 61b in the axis S direction and that extends in the axis S direction. An inner diameter (passage area) of the second internal passage 61e is formed larger than an inner diameter (passage area) of the first internal passage 61c.

As shown in FIG. 9 and FIG. 10, the second opening 61f forms a circular hole that is formed closer to the spool 20 than the insertion hole 91a of the stator 90 in the axis S direction and that opens the second internal passage 61e in the radial direction. The passage area of the second opening 61f is formed equal to or larger than the passage area of the second internal passage 61e. Here, the passage area of the second opening 61f is the passage area of the two second openings 61f that form circular holes; the passage area of the second internal passage 61e is the passage area of the second internal passage 61e in a cross section perpendicular to the axis S.

The large-diameter tubular part 62 includes a large-diameter outer peripheral wall 62s, a second internal passage 62a, four second openings 62b, four lightening parts 62c formed around the second openings 62b, and a second abutting part 62d.

The large-diameter tubular part 62 is a region disposed in the sleeve 10, and, as shown in FIG. 8, when the transmission member 60 deviates from the axis S and is inclined, the large-diameter outer peripheral wall 62s defined by the large-diameter tubular part 62 may come into contact with the inner peripheral surface 13 of the sleeve 10.

To communicate with the second internal passage 61e, the second internal passage 62a forms a cylindrical hole that is formed closer to the spool 20 than the facing wall 61b in the axis S direction and that extends in the axis S direction. An inner diameter (passage area) of the second internal passage 62a is formed larger than an inner diameter (passage area) of the second internal passage 61e.

As shown in FIG. 9 and FIG. 10, the second opening 62b forms a substantially rectangular hole that is formed closer to the spool 20 than the insertion hole 91a of the stator 90 in the axis S direction and that opens the second internal passage 62a in the radial direction. The passage area of the second opening 62b is formed equal to or larger than the passage area of the second internal passage 62a. Here, the passage area of the second opening 62b is the passage area of the four second openings 61f that form substantially rectangular holes; the passage area of the second internal passage 62a is the passage area of the second internal passage 62a in a cross section perpendicular to the axis S.

The four lightening parts 62c are formed so that a region around each of the second openings 62b is recessed radially inward from the outer peripheral surface 62s of the large-diameter tubular part 62. According to this, when the transmission member 60 is disposed in the sleeve 10, a sufficient gap space that allows the flow of the hydraulic oil can be secured between the transmission member 60 and the inner peripheral surface 13.

The second abutting part 62d is formed as an annular and concave tapered surface centered on the axis S, to define an end that opens the second internal passage 62a toward the spool 20 and to abut against the second end 27 of the spool 20.

The annular stepped part 63 is formed at a boundary between the small-diameter tubular part 61 and the large-diameter tubular part 62, and faces an annular facing part 91e of the stator 90 in the axis S direction.

In the above configuration, the transmission member 60 includes a large-diameter outer peripheral wall 62s that comes into contact with the inner peripheral surface 13 of the sleeve 10 to regulate the inclination, and a small-diameter outer peripheral surface 61s that comes into contact with the inner peripheral surface of the insertion hole 91a of the stator 90 to regulate the inclination, therefore, as shown in FIG. 8, even in a state in which the spool 20 is locked and the transmission member 60 deviates from the axis S and is inclined, the inclination is regulated within a range in which at least a part of the first abutting part 61a of the transmission member 60 faces the receiving recess 75 of the plunger 70, and at least a part of the second abutting part 61d of the transmission member 60 faces the second end 27 that is the convex end of the spool 20.

The plunger 70 is formed of a ferromagnetic material such as iron or the like into a columnar shape extending in the axis S direction, and includes, as shown in FIG. 4 and FIG. 9, an outer peripheral surface 71, a first end 72, a second end 73, a through passage 74, and a receiving recess 75.

The outer peripheral surface 71 is slidably guided in the axis S direction by an inner wall surface 81 of the guide sleeve 80.

The first end 72 forms an annular flat surface perpendicular to the axis S.

The second end 73 forms an annular flat surface perpendicular to the axis S, and abuts against a stopper 83 of the guide sleeve 80 in the rest position.

The through passage 74 forms a cylindrical hole that is disposed on the axis S, extends in the axis S direction and penetrates from the first end 72 to the second end 73.

Around the through passage 74 of the first end 72, the receiving recess 75 is formed as an annular and concave tapered surface centered on the axis S, to receive and abut against the first abutting part 61a of the transmission member 60.

Here, as shown in FIG. 7, the receiving recess 75 has an outer edge 75a provided with an opening diameter equal to or larger than the outer diameter of the first abutting part 61a of the transmission member 60.

Accordingly, the first abutting part 61a of the transmission member 60 can easily enter and abut against the receiving recess 75 of the plunger 70.

The guide sleeve 80 is formed by deep drawing a sheet metal material into a bottomed cylindrical shape centered on the axis S, and includes, as shown in FIG. 4 and FIG. 9, the inner wall surface 81, a bottom wall surface 82, the stopper 83 protruding from the bottom wall surface 82, and a flange 84.

The inner wall surface 81 slidably guides the plunger 70 in the axis S direction.

The stopper 83 is formed protruding inward from the bottom wall surface 82 in the axis S direction, and serves to define the rest position of the plunger 70.

In this way, since the stopper 83 is formed protruding inward, in a state in which the plunger 70 is abutting against the stopper 83, a gap space is defined between the second end 73 of the plunger 70 and the bottom wall surface 82. Accordingly, it can be prevented that the plunger 70 adheres to the bottom wall surface 82 of the guide sleeve 80 and becomes inoperable.

The flange 84 includes a region formed in a multi-step conical shape so as to cover the transmission member 60 from the outside in the radial direction, and is sandwiched and fixed between the stator 90 and the bracket 110 together with the seal member 100.

In a relationship between the guide sleeve 80 and the plunger 70 described above, when the plunger 70 is located in an advance position in a direction of compressing the energizing spring 30, as shown in FIG. 10, by the inner wall surface 81 and the bottom wall surface 82 of the guide sleeve 80 and the second end 73 of the plunger 70, a retreat movement space RS is defined allowing the plunger 70 to retreat to the rest position.

To form a part of a magnetic path and exert a magnetomotive force on the plunger 70 by energizing the coil 132, the stator 90 is formed of a ferromagnetic material, and a front yoke 91 having a multi-stage columnar shape and an end yoke 92 having a substantially disc shape are integrally fixed thereto by crimping.

As shown in FIG. 4, FIG. 9, and FIG. 10, the stator 90 includes the insertion hole 91a, an annular facing surface 91b, an annular inner wall surface 91c, a guide part 91d, an annular facing part 91e, and joint surfaces 92a and 92b.

The insertion hole 91a forms a cylindrical hole centered on the axis S for the small-diameter tubular part 61 of the transmission member 60 to be inserted therein with a predetermined gap G therebetween.

Here, the passage area of the gap G defined around the transmission member 60 in the insertion hole 91a is formed smaller than the passage area of the first opening 61d. The passage area of the gap G is the passage area of the gap G having an annular shape in a cross section perpendicular to the axis S.

Moreover, the gap G is preferably as small as possible within a range in which viscous resistance of the hydraulic oil does not increase.

In addition, as shown in FIG. 8, the insertion hole 91a is formed having an inner diameter dimension that, in a state regulates the transmission member 60 not to deviate from the range allowing the first abutting part 61a of the transmission member 60 to be inserted into the receiving recess 75 of the plunger 70, in a state in which the inner peripheral surface is in contact with the small-diameter outer peripheral wall 61s that is the outer peripheral wall of the transmission member 60.

The annular facing surface 91b forms an annular flat surface to face the first end 72 of the plunger 70 in the axis S direction.

To face the outer peripheral surface 71 of the plunger 70 with a predetermined gap therebetween in the radial direction in a state in which the plunger 70 has advanced, the annular inner wall surface 91c forms a substantially cylindrical surface centered on the axis S.

The guide part 91d is formed as an annular and concave tapered surface centered on the axis S, and serves to guide the first abutting part 61a of the transmission member 60 toward the axis S when the transmission member 60 is inserted into the insertion hole 91a of the stator 90. Moreover, the guide part 91 may be formed as an annular and concave surface.

The annular facing part 91e has an annular shape centered on the axis S to face the annular stepped part 63 of the transmission member 60 in the axis S direction.

In an assembled state, the joint surfaces 92a and 92b form flat surfaces to make close contact with the seal members 50 and 100 and to be sandwiched and fixed by the flange 15 of the sleeve 10 and the bracket 110.

In a relationship between the stator 90 and the plunger 70 described above, when the plunger 70 is in the rest position, as shown in FIG. 9, by the annular facing surface 91b and the annular inner wall surface 91c of the stator 90 and the first end 72 of the plunger 70, an advance movement space FS is defined allowing the plunger 70 to advance in the direction of compressing the energizing spring 30.

The seal member 100 is an O-ring made of rubber, disposed between the joint surface 92b of the stator 90 and the flange 84 of the guide sleeve 80, and sealing a joint region of the stator 90 and the guide sleeve 80.

The bracket 110 is formed of a metal material and includes an annular part 111 and an attachment part 112.

The annular part 111 is sandwiched between the mold unit 130 and the stator 90 (end yoke 92), and is also fitted and fixed in a fitting recess 152 of the outer yoke 150.

The attachment part 112 extends outside the outer yoke 150 and is fixed to the engine body EB by a screw or the like.

The inner yoke 120 forms a part of a magnetic path and is formed of a ferromagnetic material into a bottomed cylindrical shape with collar, and includes, as shown in FIG. 4 and FIG. 9, a cylindrical part 121 and a collar 122.

The cylindrical part 121 is formed so that the guide sleeve 80 is fitted inside thereof and the bobbin 131 of the mold unit 130 is fitted outside thereof.

The collar 122 is fitted into a fitting recess 153 of the outer yoke 150 and fixed by crimping.

As shown in FIG. 4 and FIG. 9, the mold unit 130 includes the bobbin 131 made of resin fitted into the cylindrical part 121 of the inner yoke 120, a coil 132 for excitation wound around the bobbin 131, and a connector 133 integrally formed with a cylindrical part covering around the coil 132 and surrounding a terminal.

The seal member 140 is an O-ring made of rubber, disposed between the collar 122 of the inner yoke 120 and the bobbin 131 of the mold unit 130 and sealing a space between the bobbin 131 and the inner yoke 120.

The outer yoke 150 forms a part of a magnetic path and is formed of a ferromagnetic material into a cylindrical shape, and includes, as shown in FIG. 4 and FIG. 9, a cylindrical part 151, the fitting recess 152 and the fitting recess 153.

The cylindrical part 151 is formed in a cylindrical shape centered on the axis S, and is formed to cover from the outside in the radial direction, a region where the coil 132 of the mold unit 130 is wound, the collar 122 of the inner yoke 120, the annular part 111 of the bracket 110, the stator 90 (end yoke 92), and the flange 15 of the sleeve 10.

In a state in which the annular part 111 of the bracket 110, the stator 90 (end yoke 92), and the flange 15 of the sleeve 10 are fitted into the fitting recess 152 in the axis S direction, by crimping a tip region of the fitting recess 152, the annular part 111, the stator 90 (end yoke 92) and the flange 15 are fixed.

In a state in which the collar 122 of the inner yoke 120 is fitted into the fitting recess 153, by crimping a tip region of the fitting recess 153, the collar 122 is fixed.

Next, a switching operation of the electromagnetic switching valve V is described.

First, in a state in which the coil 132 is not powered, by the energizing force of the energizing spring 30 via the spool 20 and the transmission member 60, the plunger 70 stops in the rest position where the second end 73 abuts against the stopper 83, as shown in FIG. 9.

In addition, the spool 20 stops in a retreat position corresponding to the rest position of the plunger 70 via the transmission member 60.

In this retreat position, the first valve 22 of the spool 20 is in a state of closing an oil passage between the first port 11e and the supply port 11b and opening an oil passage between the first port 11e and the discharge port 11c.

In addition, the second valve 23 of the spool 20 is in a state of opening an oil passage between the second port 11f and the supply port 11b and closing an oil passage between the second port 11f and the discharge port 11d.

At this time, the hydraulic oil is discharged through the first oil passage 5 and supplied through the second oil passage 6.

Subsequently, when the coil 132 is appropriately energized and the magnetomotive force is generated, the plunger 70 advances while resisting the energizing force of the energizing spring 30. As shown in FIG. 10, the first end 26 of the spool 20 abuts against the receiving part 14, and the spool 20 is positioned in the maximum advance position.

In this retreat maximum advance position., the first valve 22 of the spool 20 is in a state of opening the oil passage between the first port 11e and the supply port 11b and closing the oil passage between the first port 11e and the discharge port 11c.

In addition, the second valve 23 of the spool 20 is in a state of closing an oil passage between the second port 11f and the supply port 11b and opening an oil passage between the second port 11f and the discharge port 11d.

At this time, the hydraulic oil is supplied through the first oil passage 5 and discharged through the second oil passage 6.

Moreover, the energization of the coil 132 can be appropriately controlled and the spool 20 can be stopped in an intermediate position.

In this intermediate position, the first valve 22 of the spool 20 is in a state of closing an oil passage between the first port 11e and the supply port 11b and closing an oil passage between the first port 11e and the discharge port 11c.

In addition, the second valve 23 of the spool 20 is in a state of closing an oil passage between the second port 11f and the supply port 11b and closing an oil passage between the second port 11f and the discharge port 11d.

At this time, the supply and discharge of hydraulic oil are cut off in both the first oil passage 5 and the second oil passage 6.

When the electromagnetic switching valve V performing the above switching operation is applied to, for example, the valve timing changing device M of the camshaft CS on the intake side of the internal combustion engine, the first oil passage 5 is connected to the advance chamber AC and the second oil passage 6 is connected to the retard chamber RC.

Therefore, when the plunger 70 is in the rest position, a valve timing of an intake valve is held in a retard position, and by advancing the plunger 70 according to an operation condition, the valve timing of the intake valve is positioned in an advance position.

On the other hand, when the electromagnetic switching valve V performing the above switching operation is applied to, for example, the valve timing changing device M of the camshaft CS on the exhaust side of the internal combustion engine, the first oil passage 5 is connected to the retard chamber RC and the second oil passage 6 is connected to the advance chamber AC.

Therefore, when the plunger 70 is in the rest position, a valve timing of an exhaust valve is held in the advance position, and by advancing the plunger 70 according to an operation condition, the valve timing of the exhaust valve is positioned in the retard position.

Next, the flow of the hydraulic oil around the plunger 70 and the transmission member 60 in the electromagnetic switching valve V performing the above switching operation is described.

When the plunger 70 advances from the rest position, as shown in FIG. 10, the hydraulic oil in the advance movement space FS passes through the through passage 74 of the plunger 70 via the first opening 61$d$ of the transmission member 60 and the first internal passage 61$c$, and flows into the retreat movement space RS defined behind the plunger 70, as shown by arrows. Accordingly, the plunger 70 is capable of smoothly advancing.

On the other hand, in the internal space SS of the sleeve 10, the transmission member 60 is pushed by the plunger 70 and advances together with the spool 20.

Here, the passage area of the gap G defined around the small-diameter tubular part 61 of the transmission member 60 in the insertion hole 91$a$ of the stator 90 is equal to or smaller than the passage area of the first opening 61$d$, that is, the passage area of the gap G is formed as small as possible within the range in which the viscous resistance does not increase. Therefore, it is difficult for the hydraulic oil (particularly foreign matter) in the internal space SS to flow into the advance movement space FS through the insertion hole 91$a$.

In this state, in the hydraulic oil in the internal space SS, because the annular stepped part 63 and the annular facing part 91$e$ are separated by an increasing distance, for example, as shown by arrows in FIG. 10, the hydraulic oil in the second internal passage 61$e$ of the transmission member 60 flows from the second opening 61$f$ into the internal space SS, and the hydraulic oil in the internal space SS outside the transmission member 60 flows from the second opening 62$b$ into the second internal passages 62$a$ and 61$e$, or the hydraulic oil in the vicinity of the discharge port 11$d$ and the discharge oil passage 4 flows into the internal space SS through the communication passage 11$i$. In this way, the hydraulic oil in the internal space SS circulates around the transmission member 60 on the whole.

When the plunger 70 retreats toward the rest position from the advance position, as shown by arrows in FIG. 9, the hydraulic oil in the retreat movement space RS passes through the first passage 61$c$ and the first opening 61$d$ of the transmission member 60 via the through passage 74 of the plunger 70, and flows into the advance movement space FS defined on a front side of the plunger 70. Accordingly, the plunger 70 is capable of smoothly retreating.

On the other hand, in the internal space SS of the sleeve 10, the transmission member 60 retreats together with the spool 20 by the energizing force of the energizing spring 30, following the plunger 70.

Here, the passage area of the gap G defined around the small-diameter tubular part 61 of the transmission member 60 in the insertion hole 91$a$ of the stator 90 is, as described above, equal to or smaller than the passage area of the first opening 61$d$, that is, the passage area of the gap G is formed as small as possible within the range in which the viscous resistance does not increase. Therefore, it is difficult for the hydraulic oil (particularly foreign matter) in the internal space SS to flow into the advance movement space FS through the insertion hole 91$a$.

In this state, in the hydraulic oil in the internal space SS, because the annular stepped part 63 and the annular facing part 91$e$ are separated by a decreasing distance, for example, as shown by arrows in FIG. 9, the hydraulic oil in the internal space SS outside the transmission member 60 flows from the second opening 61$f$ of the transmission member 60 into the second internal passage 61$e$, and the hydraulic oil in the second internal passages 62$a$ and 61$e$ inside the transmission member 60 flows from the second opening 62$b$ into the internal space SS outside the transmission member 60, or the hydraulic oil in the internal space SS flows out to the discharge port 11$d$ and the discharge oil passage 4 through the communication passage 11$i$. In this way, the hydraulic oil in the internal space SS circulates around the transmission member 60 on the whole.

Here, since the passage area of the first internal passage 61$c$ is formed equal to or larger than the passage area of the through passage 74, and the passage area of the first opening 61$d$ is formed equal to or larger than the passage area of the first internal passage 61$c$, when the hydraulic oil moves from the advance movement space FS to the retreat movement space RS or moves from the retreat movement space RS to the advance movement space FS, a dampering effect or the like caused by throttling resistance can be prevented and the plunger 70 cab be smoothly operated.

In addition, since the annular stepped part 63 of the transmission member 60 faces the annular facing part 91$e$ of the stator 90 in the axis S direction, by a change in the separation distance between the two, the hydraulic oil can be actively circulated in a region of the internal space SS.

Therefore, when foreign matter is mixed in the hydraulic oil in the internal space SS, the foreign matter can be prevented from flowing into an operation region of the plunger 70 through the insertion hole 91$a$. Accordingly, the plunger 70 can be prevented from being worn or locked by jamming of the foreign matter.

If the foreign matter in the hydraulic oil jams around the spool 20, the jamming state can be eliminated by appropriately reciprocating the plunger 70.

Next, a return movement of the transmission member 60 in the electromagnetic switching valve V is described with reference to FIG. 11 to FIG. 13.

First, assume that by energizing the coil 132, the plunger 70 advances, and the spool is locked by jamming of the foreign matter or the like in the hydraulic oil in a state of being moved by a predetermined amount while compressing the energizing spring 30.

Figure 11:
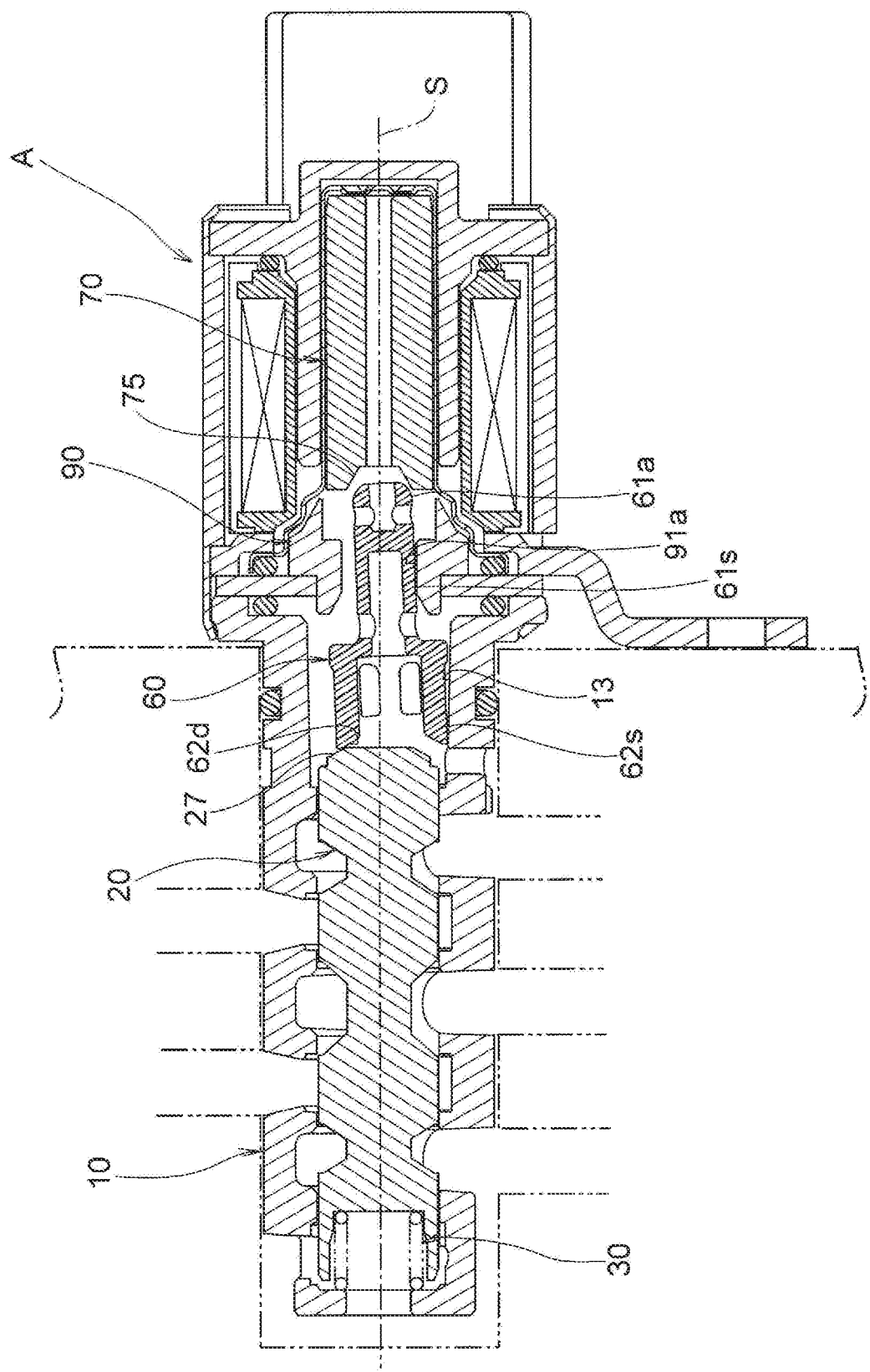
FIG. 11 is a cross-sectional view describing an automatic return of a transmission member in an electromagnetic switching valve according to an embodiment, showing a state in which a spool is locked and the transmission member deviates from an axis and is inclined.

At this time, when only the plunger 70 retreats, as shown in FIG. 11, for example, the interval between the spool 20 and the plunger 70 increases and the transmission member 60 becomes free, and, due to the influence of its own weight, external vibration, or the like, the transmission member 60 deviates from the axis S and is inclined.

In this inclined state, even if the first abutting part 61$a$ is released from the receiving recess 75 of the plunger 70 and the second abutting part 62$d$ is released from the second end 27 of the spool 20, the large-diameter outer peripheral wall 62$s$ is still in contact with the inner peripheral surface 13 and the small-diameter outer peripheral wall 61$s$ is still in contact with the inner peripheral surface of the insertion hole 91$a$.

Accordingly, the transmission member 60 is held so that at least a part of the first abutting part 61$a$ faces the receiving recess 75 in the axis S direction and at least a part of the second abutting part 62*d* faces the second end 27 in the axis S direction.

Figure 12:
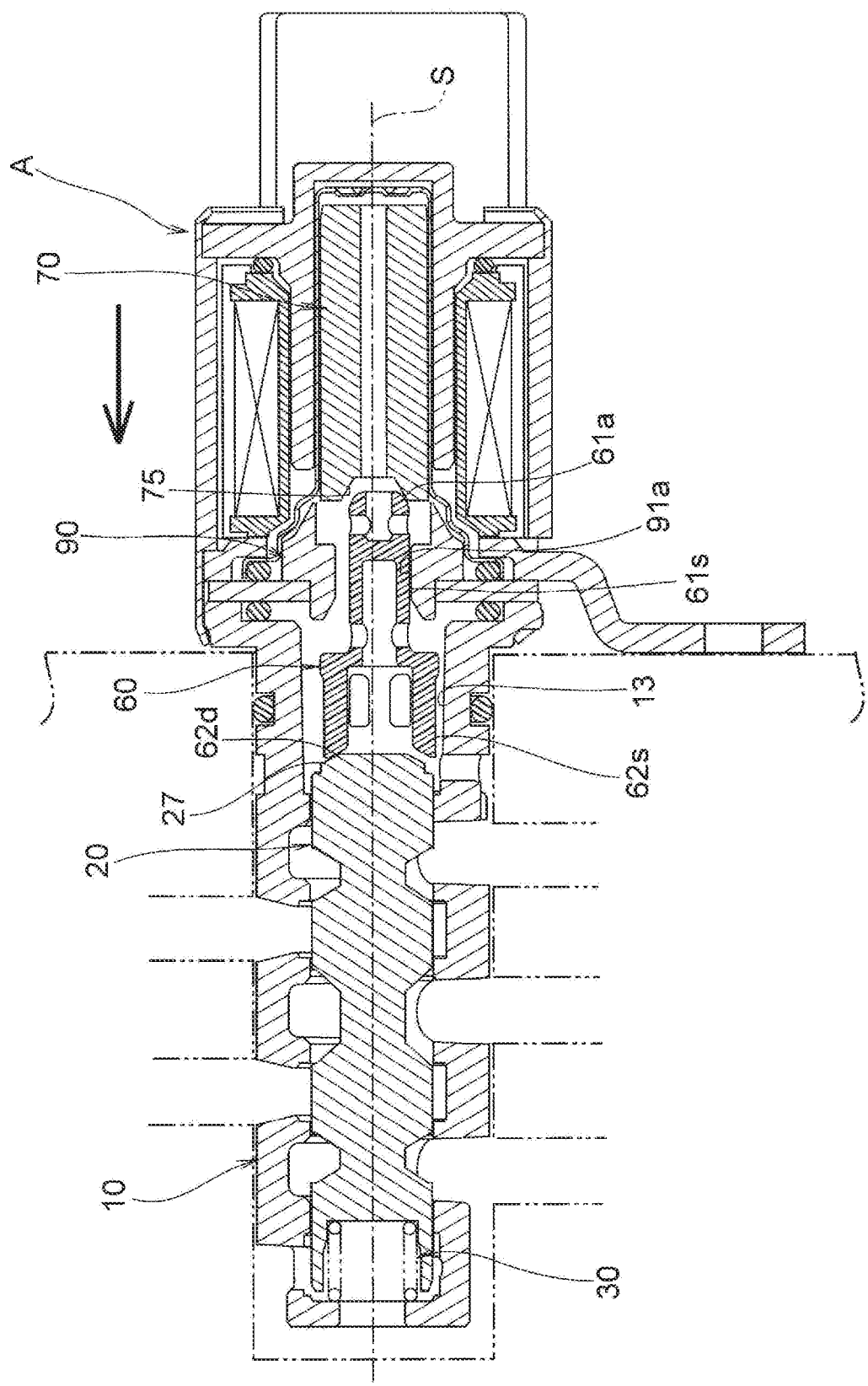
FIG. 12 is a cross-sectional view describing an automatic return of a transmission member in an electromagnetic switching valve according to an embodiment, showing a process in which a plunger is activated and the transmission member moves from a state shown in FIG. 11 and returns to an axis.

Here, when the coil 132 is energized and the plunger 70 advances, as shown in FIG. 12, the first abutting part 61*a* of the transmission member 60 moves toward the receiving recess 75 and the second abutting part 62*d* of the transmission member 60 moves toward the second end 27 of the spool 20.

Figure 13:
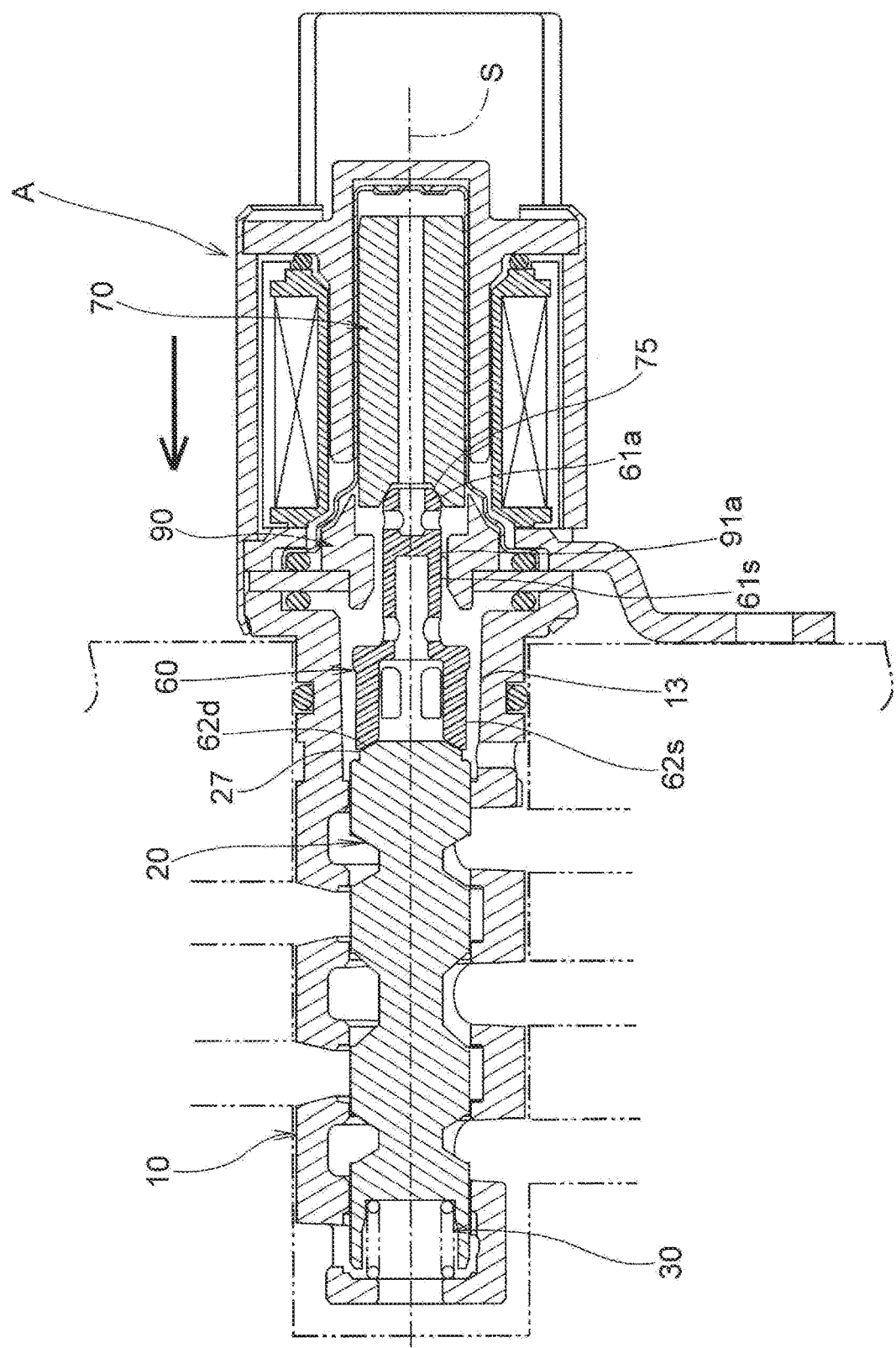
FIG. 13 is a cross-sectional view describing an automatic return of a transmission member in an electromagnetic switching valve according to an embodiment, showing a state in which a plunger is further activated and the transmission member moves from the state shown in FIG. 12 and returns to an axis.

Then when the plunger 70 further advances, as shown in FIG. 13, the first abutting part 61*a* of the transmission member 60 reliably enters and abuts against the receiving recess 75 annularly, and the second abutting part 62*d* of the transmission member 60 reliably abuts against the second end 27 of the spool 20 annularly. Accordingly, the transmission member 60 returns to the position on the axis S.

After that, when the plunger 70 further advances, the spool 20 is unlocked. If the spool 20 is not unlocked by a single impact from the plunger 70, by reciprocally driving the plunger 70 several times, the transmission member 60 repeats the states shown in FIG. 11 to FIG. 13, and the transmission member 60 returns to the position on the axis S and the spool 20 is unlocked.

Further, by repeating the retreat movement and the advance movement of the plunger 70 several times, the electromagnetic switching valve V can be reliably restored to the desired functional state.

In the electromagnetic switching valve V, the first abutting part 61*a* of the transmission 60 is formed as a convex curved surface, the receiving recess 75 of the plunger 70 is formed as a concave tapered surface, the second abutting part 62*d* of the transmission member 60 is formed as a concave tapered surface, and the second end 27, which is the convex end of the spool 20, is formed as a convex curved surface.

Therefore, by guiding the concave tapered surface of the second abutting part 62*d* and the convex curved surface of the second end 27 so as to face and annularly abut against each other, the transmission member 60 deviated from the axis S can be easily returned to the position on the axis S automatically.

Moreover, since the first abutting part 61*a* of the transmission member 60 tiltably abuts against the receiving recess 75 of the plunger 70, and the receiving recess 75 of the plunger 70 has the outer edge 75*a* having an opening diameter equal to or larger than the outer diameter of the first abutting part 61*a* of the transmission member 60, even if the first abutting part 61*a* is temporarily released from the receiving recess 75, the first abutting part 61*a* can easily slide into and abuts against the receiving recess 75.

In addition, by adopting the large-diameter outer peripheral wall 62*s* defined by the large-diameter tubular part 62 and the small-diameter outer peripheral wall 61*s* defined by the small-diameter tubular part 61 as the outer peripheral wall that regulates the inclination of the transmission member 60, compared with a case in which the transmission member has a single outer diameter, the amount of deviation of the transmission member 60 from the axis S can be suppressed.

In other words, while securing the internal space SS allowing the flow of the hydraulic oil around the transmission member 60, the process that the transmission member 60 returns to the original position can be shortened.

Furthermore, the inner peripheral surface of the insertion hole 91*a* of the stator 90 is formed having an inner diameter dimension that, in a state in which the inner peripheral surface of the insertion hole 91*a* of the stator 90 is in contact with the small-diameter outer peripheral wall 61*s* of the transmission member 60, regulates the transmission member 60 not to deviate from the range allowing the first abutting part 61*a* of the transmission member 60 to be inserted into the receiving recess 75 of the plunger 70.

Therefore, even if the transmission member 60 deviates from the axis S and is inclined, the first abutting part 61*a* of the transmission member 60 can be reliably guided to abut against the receiving recess 75 of the plunger 70.

Furthermore, since the transmission member 60 is formed of a resin material, it is easy to form a form including the small-diameter tubular part 61 and the large-diameter tubular part 62, and a form including multiple internal passages and openings as passages for hydraulic oil.

According to the electromagnetic switching valve V configured as described above, even if the spool 20 of the electromagnetic switching valve V is locked by jamming of the foreign matter and the transmission member 60 deviates from the axis S, the transmission member 60 can be automatically returned to the original position and the spool 20 can be unlocked.

In addition, by adopting the transmission member 60 that is not integrally fixed to the spool 20 or the plunger 70, the transmission member 60 can be disposed on the axis S during assembly or during automatic return to the original position while neutralizing minute misalignment, without a need to perform centering of each part with high accuracy.

Although the transmission member 60 having the small-diameter tubular part 61 and the large-diameter tubular part 62 are shown as the transmission members in the above embodiment, the disclosure is not limited thereto, and a transmission member having an outer peripheral wall that regulates its inclination in a tubular part having a single outer diameter may be used.

Although a case where the receiving recess 75 of the plunger 70 is formed as a concave tapered surface is shown in the above embodiment, the disclosure is not limited thereto, and a concave curved surface having a larger curvature radius than the convex curved surface of the first abutting part 61*a* of the transmission member 60 may be adopted. Although the transmission member 60 formed of a resin material is shown as the transmission member in the above embodiment, the disclosure is not limited thereto, and a transmission member formed of other nonmagnetic material may be adopted.

Although a case where the electromagnetic switching valve V is fitted into the fitting hole H of the engine body EB is shown in the above embodiment, the disclosure is not limited thereto, and the electromagnetic switching valve V may be mounted in other places.

As described above, according to the electromagnetic switching valve of the disclosure, the transmission member can automatically return to the original position and maintain the desired function even if it is temporarily free and deviates from the predetermined position due to locking of the spool, therefore the electromagnetic switching valve not only can be applied to the engine mounted on a vehicle such as an automobile or a two-wheeler or the like, but also is useful in controlling the flow of hydraulic oil in other hydraulic devices or the like.

In the above electromagnetic switching valve, the first abutting part of the transmission member may include a convex curved surface; the receiving recess of the plunger may include a concave tapered surface or a concave curved surface; the second abutting part of the transmission member may include a concave tapered surface; and the convex end of the spool may include a convex curved surface.

In the above electromagnetic switching valve, the receiving recess of the plunger may have an outer edge having an opening diameter equal to or larger than an outer diameter of the first abutting part of the transmission member.

In the above electromagnetic switching valve, the stator may include an insertion hole through which the transmission member is inserted, and the outer peripheral wall of the transmission member is formed so as to be in contact with an inner peripheral surface of the insertion hole in a state of being deviated from the axis and inclined.

In the above electromagnetic switching valve, the inner peripheral surface of the insertion hole of the stator may be formed having an inner diameter dimension that regulates the transmission member not to deviate from a range allowing the first abutting part of the transmission member to be inserted into the receiving recess of the plunger in a state of being in contact with the outer peripheral wall of the transmission member.

In the above electromagnetic switching valve, the transmission member may include a large-diameter tubular part in the sleeve and a small-diameter tubular part inserted through the insertion hole of the stator, and the outer peripheral wall of the transmission member may include a large-diameter outer peripheral wall defined by the large-diameter tubular part so as to be in contact with the inner peripheral surface of the sleeve in the state of being deviated from the axis and inclined; and a small-diameter outer peripheral wall defined by the small-diameter tubular part so as to be in contact with the inner peripheral surface of the insertion hole of the stator in the state of being deviated from the axis and inclined.

In the above electromagnetic switching valve, the transmission member may include an internal passage and an opening to cause the hydraulic oil to pass therethrough.

In the above electromagnetic switching valve, the transmission member may be made of a resin material.

According to the electromagnetic switching valve configured as described above, by locking of the spool or the like, the transmission member can automatically return to the original position and maintain the desired function even if it is temporarily free and deviates from the predetermined position.

What is claimed is:

1. An electromagnetic switching valve comprising:
   a sleeve, defining a port communicating with an oil passage supplying or discharging hydraulic oil;
   a spool, reciprocally movably disposed on a predetermined axis in the sleeve, opening and closing the port;
   an electromagnetic actuator, comprising a plunger disposed on the axis and a stator exerting a magnetomotive force on the plunger;
   a transmission member of a tubular shape, disposed on the axis to be interposed between the plunger and the spool and transmit a driving force; and
   an energizing spring, energizing the spool toward the plunger; wherein
   the transmission member comprises a first abutting part of a convex shape tiltably abutting against a receiving recess of the plunger; a second abutting part of a concave shape abutting against a convex end of the spool; and an outer peripheral wall that, in a state of being deviated from the axis and inclined, regulates the inclination by contacting an inner peripheral surface of the sleeve or the stator so that at least a part of the first abutting part faces the receiving recess and at least a part of the second abutting part faces the convex end, and wherein
   the transmission member comprises a large-diameter tubular art disposed in the sleeve and a small-diameter tubular part inserted through an insertion hole of the stator; and
   the outer peripheral wall comprises a large-diameter outer peripheral wall defined by the large-diameter tubular part so as to be in contact with the inner peripheral surface of the sleeve in the state of being deviated from the axis and inclined.

2. The electromagnetic switching valve according to claim 1, wherein
   the first abutting part of the transmission member comprises a convex curved surface,
   the receiving recess of the plunger comprises a concave tapered surface or a concave curved surface,
   the second abutting part of the transmission member comprises a concave tapered surface, and
   the convex end of the spool comprises a convex curved surface.

3. The electromagnetic switching valve according to claim 2, wherein the receiving recess of the plunger has an outer edge having an opening diameter equal to or larger than an outer diameter of the first abutting part of the transmission member.

4. The electromagnetic switching valve according to claim 1, wherein
   the transmission member is inserted through the insertion hole of the stator, and
      the outer peripheral wall of the transmission member is formed so as to be in contact with an inner peripheral surface of the insertion hole in the state of being deviated from the axis and inclined.

5. The electromagnetic switching valve according to claim 4, wherein
   the inner peripheral surface of the insertion hole of the stator is formed having an inner diameter dimension, in a state of being in contact with the outer peripheral wall of the transmission member, regulating the transmission member not to deviate from a range allowing the first abutting part of the transmission member to be inserted into the receiving recess of the plunger.

6. The electromagnetic switching valve according to claim 4, wherein
   the outer peripheral wall comprises a small-diameter outer peripheral wall defined by the small-diameter tubular part so as to be in contact with the inner peripheral surface of the insertion hole of the stator in the state of being deviated from the axis and inclined.

7. The electromagnetic switching valve according to claim 1, wherein
   the transmission member comprises an internal passage and an opening to cause the hydraulic oil to pass therethrough.

8. The electromagnetic switching valve according to claim 1, wherein
   the transmission member is formed of a resin material.

* * * * *